United States Patent [19]
Kaneko et al.

[11] Patent Number: 5,427,323
[45] Date of Patent: Jun. 27, 1995

[54] FISHLINE LENGTH MEASUREMENT DEVICE

[75] Inventors: Kyoichi Kaneko; Akio Yamazaki; Kazuya Nanbu, all of Tokyo, Japan

[73] Assignee: Daiwa Seiko, Inc., Tokyo, Japan

[21] Appl. No.: 133,391

[22] Filed: Oct. 8, 1993

[30] Foreign Application Priority Data

| Oct. 9, 1992 | [JP] | Japan | 4-271958 |
| Jul. 7, 1993 | [JP] | Japan | 5-037146 U |
| Aug. 2, 1993 | [JP] | Japan | 5-191315 |

[51] Int. Cl.⁶ ............... G01B 5/18; G01S 15/00; A01K 89/015
[52] U.S. Cl. ............... 242/223; 242/319; 33/719; 367/99
[58] Field of Search ............... 242/223, 319; 33/715, 33/716, 719, 505; 367/99, 100, 101

[56] References Cited

U.S. PATENT DOCUMENTS

| 4,585,182 | 4/1986 | Atobe | 242/223 |
| 4,620,371 | 11/1986 | Murakami et al. | 33/719 |
| 4,697,758 | 10/1987 | Hirose et al. | 242/223 |
| 4,739,860 | 4/1988 | Kobayashi et al. | 367/99 X |
| 4,790,492 | 12/1988 | Atobe | 242/223 |
| 4,918,672 | 4/1990 | Iwabuchi et al. | 367/99 |
| 5,007,601 | 4/1991 | Emura et al. | 242/223 |
| 5,060,205 | 10/1991 | Phelm | 367/99 X |
| 5,219,131 | 6/1993 | Furomoto | 242/223 |
| 5,236,147 | 8/1993 | Kaneko | 242/223 |

FOREIGN PATENT DOCUMENTS 1-307612 12/1989 Japan.
3-223614 10/1991 Japan.

*Primary Examiner*—Daniel P. Stodola
*Assistant Examiner*—Michael Mansen
*Attorney, Agent, or Firm*—Longacre & White

[57] ABSTRACT

In a fishline length measurement device for a fishing reel, a random access memory is provided for storing as a data map a relationship between spool rotation numbers and corresponding fishline outer circumferential surface diameters, Both are detected during initial ,casts or winding of the fishline so that a outer circumferential surface diameter corresponding to a spool rotation number detected by a spool rotation sensor is selected from the data map in subsequent casts or winding of the fishline. Fishline length is calculated based on the detected rotation number and the selected diameter. Thus, it is possible to reduce consumptive electric power of the battery without any deterioration to the fishline length measurement function. In another feature of the present invention temperature compensation is provided to correct for changes in ambient temperature surrounding the fishing reel.

1 Claim, 12 Drawing Sheets

FIG. 17

FISHLINE LENGTH MEASUREMENT DEVICE

BACKGROUND OF THE INVENTION a) Field of the Invention

The present invention relates to a fishline length measurement device for a fishing reel, and in particular to a measurement device capable of measuring an amount of feeding or winding of the fishline based on the spool rotation number with high accuracy.

b) Description of Related Art

Recently, there has been developed a fishing reel with a fishline length measurement device capable of measuring the length of a fishline fed from o,r wound onto the spool to make it possible to submerge a fishhook to a predetermined depth where fish exist or to determine the casting distance to a point.

Japanese Patent Kokai No. Hei. 1L-307612 and U.S. patent application Ser. No. 07/847,905, for example, disclose such a fishline length measurement device.

The fishline length measurement device disclosed in Japanese Kokai '612 includes: a sensor for detecting the speed and direction of rotation for a spool with respect a reel main body; a rotation/counter-rotation counter for up-counting or down-counting pulse signals sent from the sensor; a light-emitter for emitting a spot light onto an outer circumferential surface of the fishline wound on the spool; a diameter measuring assembly detecting light reflected from the outer circumferential surface with a sensor and converting the detected light into an electric signal which is in proportion to the diameter of the spool with the fishline wound thereon; a calculator for calculating the length of fishline fed off or wound on the spool based on the diameter data and the count; and, a display indicating the fishline length calculated by the calculator. The fishline length measurement device makes it possible to accurately measure the amount of the fishline fed from or wound onto the spool.

The fishline length measurement device disclosed in U.S. Application '905 includes: a sensor for detecting the speed and direction of rotation for, r a spool with respect a reel main body; a rotation/counter-rotation counter for up-counting or down-counting pulse signals sent from the sensor; a diameter measuring assembly using an ultrasonic wave beam reflected off an outer circumferential surface of the fishline wound on the spool to determine the diameter of the fishline wound on the spool; a calculator for calculating the length of fishline fed off or wound on the spool based on the diameter data and the count and, a display indicating the fishline length calculated by the calculator.

The diameter measuring assembly in U.S. Application '905 includes a transmitter generating the ultrasonic wave beam, a receiver detecting the reflected wave beam, and a timer measuring the time lag between generating the ultrasonic wave beam and receiving the reflected wave. Then, the assembly converts the time lag into a signal which is in proportion to the diameter of the fishline wound on the spool, and the calculator calculates the fishline length based on the signal and the number of spool rotations counted during the feed or winding of the fishline.

The aforementioned fishline length measurement devices can measure the fed or wound fishline length with accuracy, however, consumption of battery power is large because the spot light or the ultrasonic wave beam is continuously generated during the feed or winding process of the fishline to measure the length. If large capacity batteries are incorporated to provide adequate power, the entire device becomes large.

SUMMARY OF THE INVENTION

The present invention was made in order to solve the aforementioned disadvantages in the related art. Accordingly, an objective of the present invention is to provide a fishline length measurement device which reduces the consumption battery power while maintaining its fishline length measurement function during the feed or winding of the fishline In order to attain the aforementioned and other objective, the present invention provides a fishline length measurement device including: a sensor for detecting the speed and direction of rotation for a spool with respect a reel main body; a rotation/counter-rotation counter for up-counting or down-counting pulse signals sent from the sensor; a diameter measuring assembly using an ultrasonic wave beam reflected off an outer circumferential surface of the fishline wound on the spool to determine the diameter of the fishline wound on the spool; a first calculator for calculating the length of fishline fed off or wound on the spool based on the diameter data and the count; a memory storing a relationship between the number of rotations detected by the counter and the diameter of the outer circumferential surface detected by the diameter measuring assembly; a second calculator calculating fishline length fed off or wound on the spool based on the number of rotations detected by the counter and the relationship stored in the memory; and, a display indicating the fishline length calculated by the calculator.

The present invention further provides a fishline length measurement device including: a sensor for detecting the speed and direction of rotation for a spool with respect a reel main body; a rotation/counter-rotation counter for up-counting or down-counting pulse signals sent from the sensor; a diameter measuring assembly using an ultrasonic wave beam reflected off an outer circumferential surface of the fishline wound on the spool to determine the diameter of the fishline wound on the spool; a first calculator for calculating the length of fishline fed off or wound on the spool based on the diameter data and the count; a memory storing a relationship between the number of rotations detected by the counter and the diameter of the outer circumferential surface detected by the diameter measuring assembly; a second calculator estimating, based on the relationship, the diameter of the outer circumferential surface corresponding to the number of spool rotations detected by the counter, and calculating the fishline length fed off or wound on the spool based on the rotations detected by the counter number and the estimated diameter; and, a display indicating the fishline length calculated by the calculator.

The relationship may be stored as a data map, a linear equation, or the like.

According to the present invention, once the relationship between the outer circumferential surface diameter and the number of spool rotations is determined, it is possible to calculate the fed off or wound on fishline length without continuously measuring the outer circumferential surface diameter.

DESCRIPTION OF THE PREFERRED EMBODIMENT

Preferred embodiments of this invention will now be described in detail with reference to the accompanying drawings.

Figure 1:
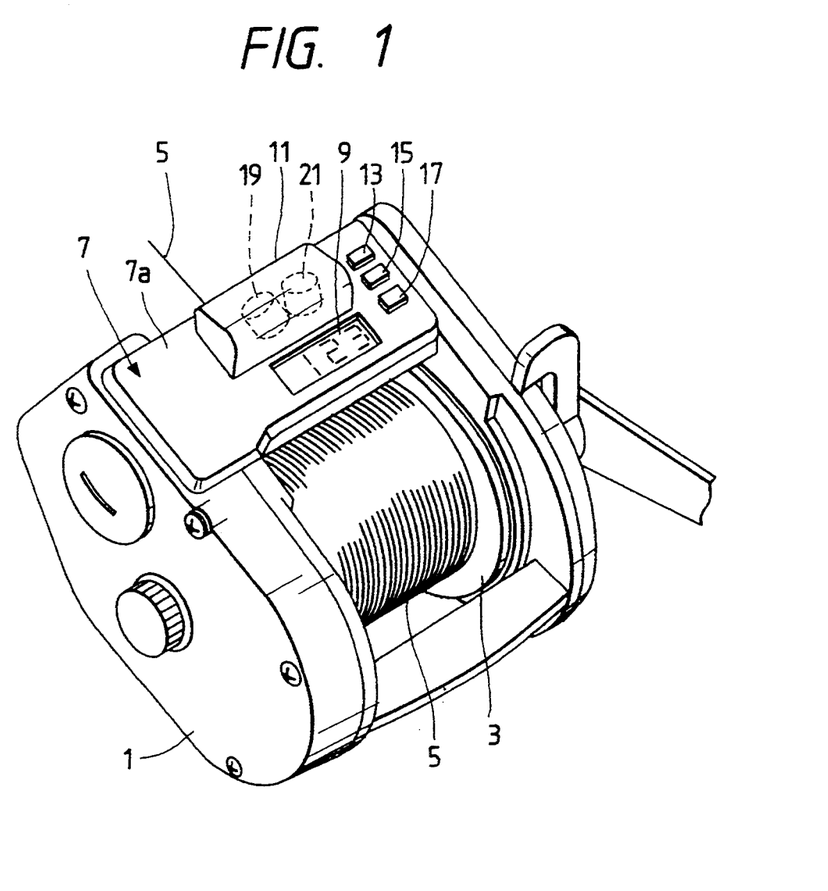
FIG. 1 is a perspective view showing a fishing reel with a fishline length measurement device according to an embodiment of the present invention.
Figure 2:
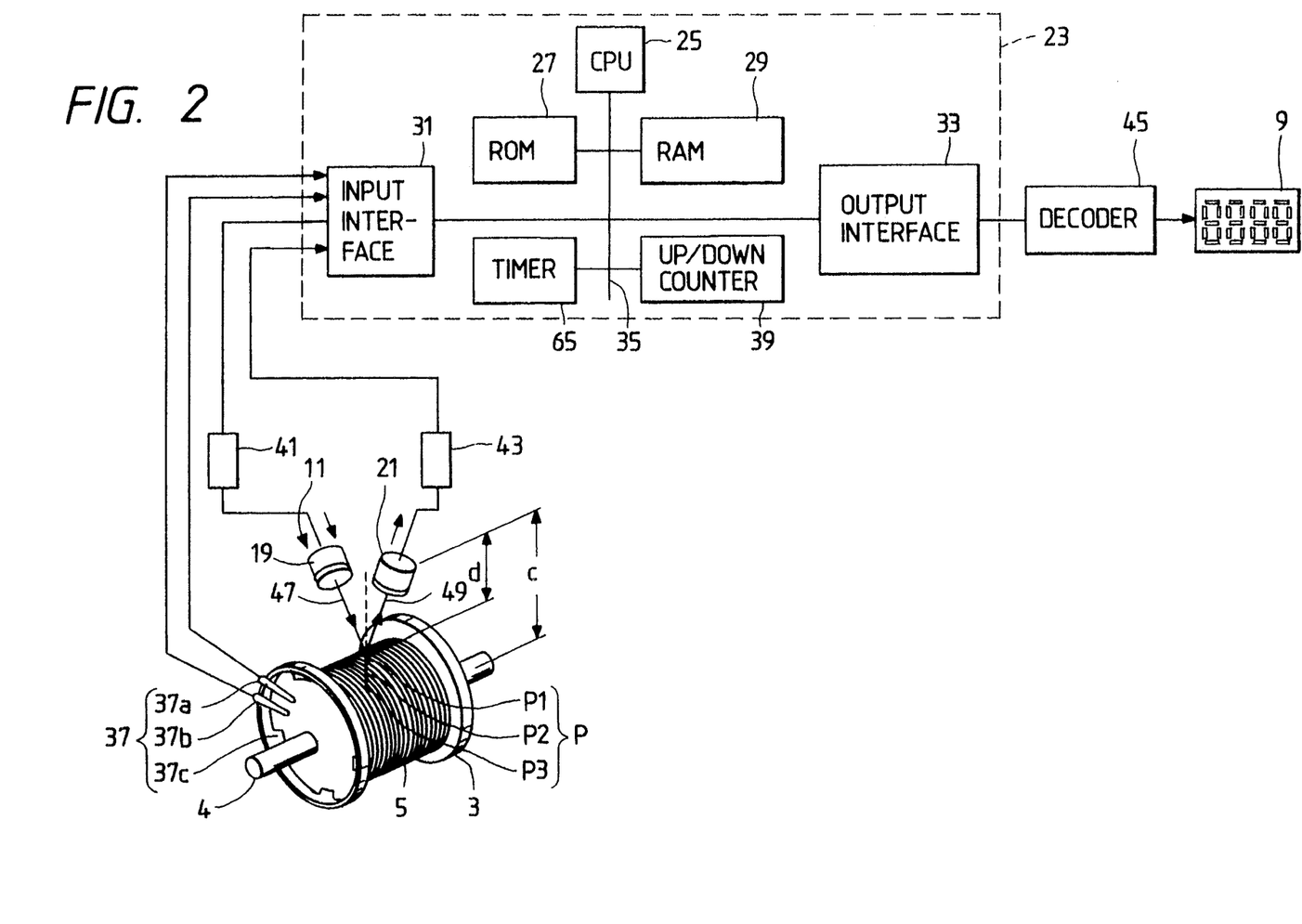
FIG. 2 is a schematic view showing the construction of the fishline length measurement device of the embodiment.

A spool 3 is supported for relative rotation with respect to a reel main body 1 so that a fishline 5 may be wound onto or unwound (fed) from the spool 3.

A relatively flat waterproof box 7 accommodates therein a fishline measurement device according to the present invention. Various switches such as a reset switch 13, a start switch 15 and a stop switch 17, as well as a fishline length digital display device 9 are provided on an upper panel 7a of the box 7. The box 7 also contains a device 11 for measuring the diameter of the spool 3 with the fishline 5 wound thereon. Two separate ultrasonic wave sensors 19 and 20 are incorporated in the diameter measurement device 11. An ultrasonic transmitter 19 emits an ultrasonic wave beam 47 toward an outer circumference P of the fishline wound on the spool 3, and an ultrasonic receiver 21 receives a reflected wave 49 from the outer circumference P of the fishline wound on the spool 3.

A microcomputer 23 performs fishline length calculation control, fishline length display control, data input/output control and so on. The microcomputer 23 includes a central processing unit (CPU) 25 for controlling and monitoring a program in memory, a data memory, a timer and an input/output device. The CPU 25 also executes the necessary calculations and data transfer processings.

The microcomputer 23 further includes an input interface 31, an output interface 33, a read only memory (ROM) 27 storing a fishline length calculation processing program (e.g. a fishline length calculation formula), and a random access memory (RAM) 29 to which data such as calculation results from the CPU 25 is inputted and stored. A buss 35 connects the CPU 25 to the memories 27,29 and the interfaces 31,33.

A sensor 37 detects number and direction of spool rotations. The sensor 37 includes a pair of reed switches 37a and 37b provided on the reel main body 1 and a plurality of magnets 37c fixed on an inner peripheral edge of the spool 3 so as to confront the reed switches 37a and 37b.

A spool forward or backward rotation judgement signal is obtained by detecting which one of the reed switches 37a and 37b is put into ON or OFF state prior to the other as a consequence of rotation by the magnets 37c. The judgement signal is entered into the CPU 25 through the input interface 31 so that the CPU 25 sets an up/down counter 39 contained in the microcomputer 23 in the appropriate up-count or down-count state. Simultaneously, pulse signals indicative of the rotation of the spool 3 are obtained as a consequence of repeatedly turning on and off the reed switches 37a and 37b via the magnets 37c. The pulse signals are entered into the up/down counter 39 through the input interface 31 so that the number of pulses are counted upwardly or downwardly by the up/down counter 39.

The diameter measurement device 11 is connected to the input interface 31 through sending means 41 and receiving means 43. Although not shown in the drawings, each of the reset switch 13, the start switch 15 and[stop switch 17 is also connected to the input interface 31. The digital display 9 is connected to the output interface 33 through a decoder 45.

Figure 3:
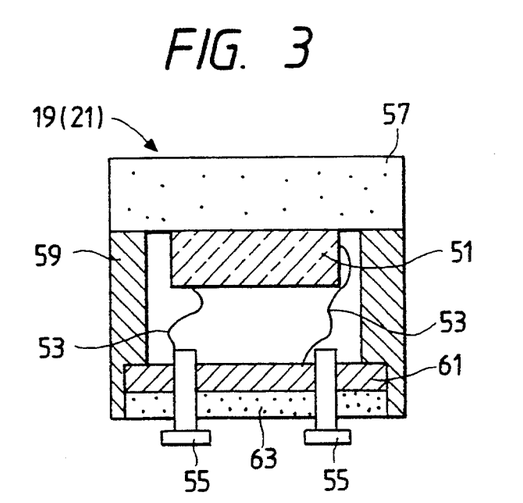
FIG. 3 is a cross-sectional view showing an ultrasonic wave sensor used in the present invention.

The ultrasonic transmitter 19 and the ultrasonic receiver 21 each have a column-like appearance and a water-proof construction. They include piezoelectric ceramics 51 and terminals 55 each connected to the ceramics 51 through lead wires 53. Referring to FIG. 3, the ultrasonic transmitter 19 and the ultrasonic receiver 21 are constructed with an acoustic matching layer 57, a metallic casing 59, a base 61, and a sealing member 63.

Control means for the diameter measurement device 11 will now be described with particular respect to FIG. 2. The control means includes the sending means 41 and the receiving means 43. The sending means has a sending circuit which generates the input for the ultrasonic transmitter 19 to emit the ultrasonic wave beam 47 onto the outer circumferential surface P of the fishline wound on the spool 3. The receiving means 43 has a reception circuit which receives the output from the ultrasonic receiver 21 when the reflected wave 49 from the outer circumferential surface P is detected.

A timer 65 in the microcomputer 23 measures a time lag $\Delta T$ between the point in time at which the ultrasonic wave beam 47 is emitted from the ultrasonic transmitter 19 and a point in time at which the reflected beam 49 is received by the ultrasonic receiver 21.

Based on the measured time lag ΔT, a distance d between the transmitter and the outer circumferential surface P is calculated using a formula stored in the ROM 27.

Figure 4:
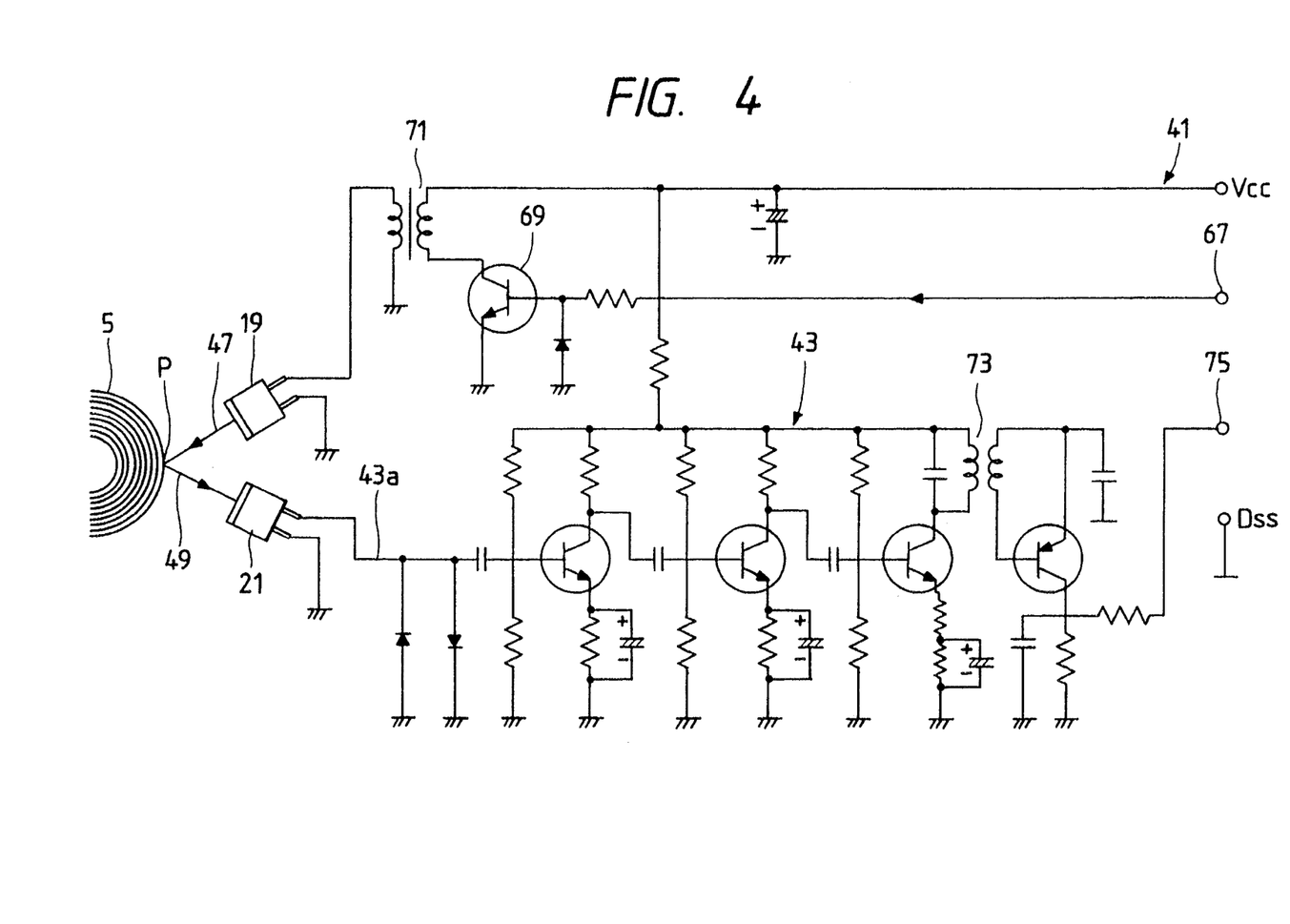
FIG. 4 shows a transmitting and receiving[circuit provided in the fishline length measurement device according to the present invention.

FIG. 4 shows an example of the control means for the diameter measurement device 11. A measurement start instruction signal is sent from the CPU 25 to the control means through a trigger terminal 67. A transistor 69 is turned on so that a number of high voltage pulse signals are supplied from a pulse transformer 71 to the ultrasonic transmitter 19, the number being designated by the CPU 25.

The transmitter 19, in turn, generates the ultrasonic wave beam 47 corresponding to the pulse signals. The ultrasonic wave beam 47 is reflected on the outer circumferential surface P of the fishline wound on the spool 3 to provide the reflected wave 49.

The reflected wave 49 induces a wave reception voltage in the ultrasonic receiver 21 which is received via the reception circuit 43a, transmitted through the receiving means 43 (e.g. a multi-stage amplifier circuit with a detected-wave transformer 73), and output as a signal from a detector terminal 75 to the input interface 31. The timer 65 is activated by the measurement start instruction signal of the CPU 25 and terminated by the signal from the detector terminal 75. This time lag ΔT is measured and written to the RAM 29 for use calculating the distance d.

Figure 5:
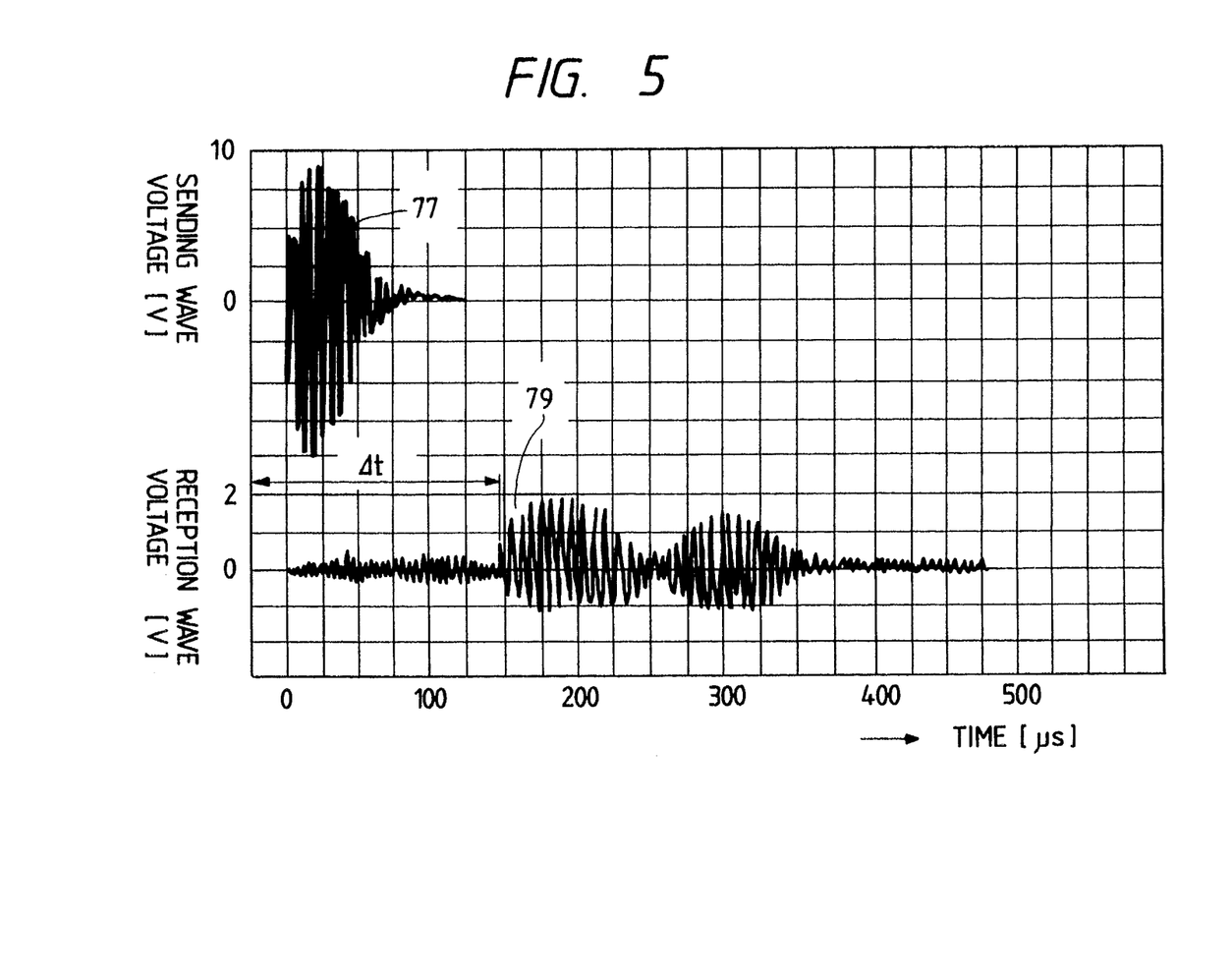
FIG. 5 illustrates the generation and reception of the ultrasonic wave beam in the present invention.

FIG. 5 illustrates an example of measuring the time lag. A voltage 77, which lasts a time period of 30μs, is applied to the ultrasonic transmitter 19 every calculation cycle of the CPU 25 (for example, 0.2 second). The calculation cycle is selected so that a measurement is taken once every rotation of the spool 3. The ultrasonic wave beam 47 is emitted from the ultrasonic transmitter 19 toward the wound fishline outer circumferential surface P and the reflected wave 49 from the surface P is received by the ultrasonic receiver 21 and induces a voltage therein. The voltage is amplified in the receiving means 43 and outputted therefrom as a reception pulse 79. A time period of 150μs between the leading edges of the sending pulse 77 and the reception pulse 79 is measured as the time lag ΔT.

The distance d between the wound fishline outer circumferential surface P and each of the ultrasonic transmitter 19 and the ultrasonic receiver 21 can be calculated using the formula, d=(v/2)×ΔT where v denotes the sonic velocity, the distance d can be obtained when the time lag ΔT is measured.

Figure 6:
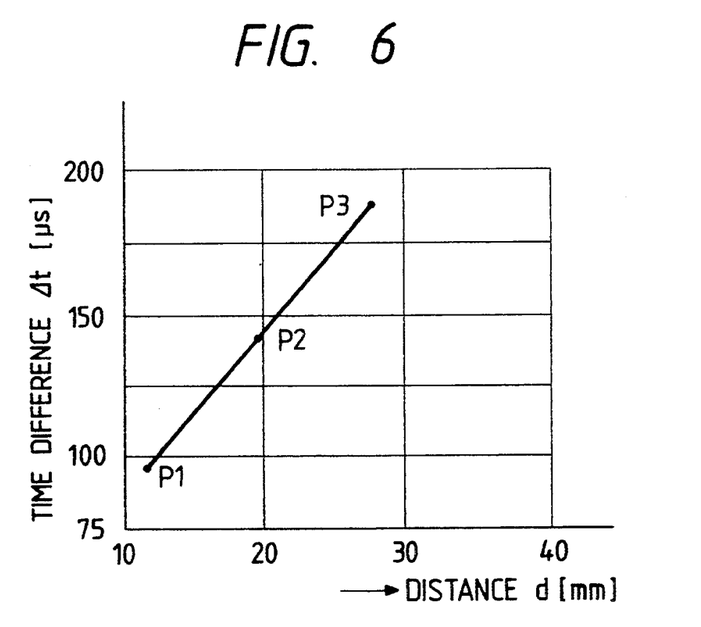
FIG. 6 is a graph showing a relationship between a distance to outer circumferential surface, as described ]below, and a time lag $\Delta T$.

FIG. 6 shows the relationship between the time lag ΔT and the distance d from the sensor surface to the outer circumferential surface P. As can be seen, the relationship between the time lag ΔT and the distance d can be expressed by a simple linear equation.

When the distance d is obtained, the diameter D of the wound fishline can be calculated in the CPU 25. Expressing the distance from a spool shaft 4 of the spool 3 to either of the ultrasonic transmitter 19 or the ultrasonic receiver 21 as "c", the diameter D can be easily calculated using D=(c−d)×2.

The fishline length can be determined based on the wound fishline diameter D as will be described below. The process for measuring a fishline length according to the present invention will now be described.

Henceforth, the formula used for calculating the distance between the outer circumferential surface P and each of the transmitter 19 and the receiver 21 will be expressed as $$d_x = (v/2) \times \Delta T$$

where the variable $d_x$ denotes the distance between the outer circumferential surface P and each of the transmitter 19 and the receiver 21 at a point in time when the spool 3 has rotated X number of turns (i.e. during the $X^{th}$ calculation cycle). Also the formula used for calculating the diameter of the fishline wound on the spool will be expressed as $$D_x = (c - d_x) \times 2$$

where the variable D denotes the diameter at a point in time when the spool 3 has rotated at X number of turns (i.e. during the $X^{th}$ calculation cycle).

Figure 7A:
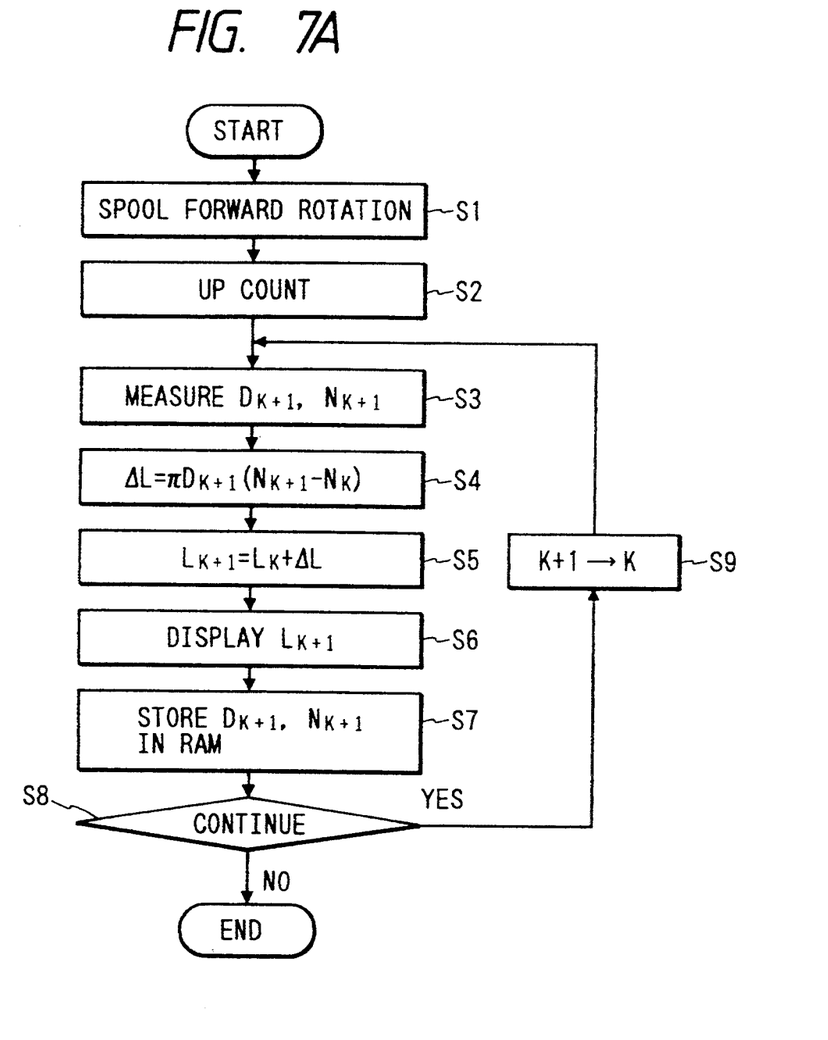
FIG. 7A is a flow-chart showing a process performed in an initial stage of operating the fishing reel.

According to the present invention, the reset switch 13 is pushed when the fishline 5 is to be fed or unwound off the spool 3 for fishing, then a map inputtable state (described below) is set and a program shown in FIG. 7A is executed.

According to the program shown in FIG. 7A, if forward rotation as a consequence of the fishline 5 being fed or unwound off the spool 3 is determined (step S1), then the signal indicative of the forward rotation of the spool 3 is transmitted from the sensor 37 through the interface 31 to the CPU 25 to set the rotation/counter-rotation counter 39 in the up-count state. Simultaneously, the pulse signals, generated from the sensor 37 every calculation cycle or one rotation of the spool 3, are transmitted through the input interface 31 to the rotation/counter-rotation counter 39 so that the up-/down counter 39 counts the up pulse signals (step S2).

The CPU 25 determines the number of spool 3 rotations ($N_{k+1}$) and calculates the wound fishline diameter ($D_{k+1}$), based on the data from the rotation/counter-rotation counter 39 and the timer 65 $D_{k+1}$ denotes the wound fishline diameter at the $k+1^{th}$ calculation cycle, i.e. the $k+1^{th}$ spool rotation from the start of the flow-chart shown in FIG. 7A. Nk+denotes the number of spool 3 rotations at the $k+1^{th}$ calculation cycle (step S3). Then, in step S4, the CPU 25 calculates the length Δ of the fishline fed from the spool 3 from the be[inning of the $k^{th}$ calculation cycle to the beginning of the $k+1^{th}$ calculation cycle, using a formula $$\Delta L = \pi \times D_{k+1} \times (N_{k+1} - N_k)$$

stored in the ROM 27. Further, the CPU 25 calculates the total fishline length $L_{k+1}$ fed from the start of the flow-chart shown in FIG. 7A to the point in time of the $k+1^{th}$ calculation cycle, using the formula $$L_{k+1} = L_k + \Delta L$$

also stored in the ROM 27 (step S5). The calculation result is outputted through the output interface 33 and the decoder 45 to the digital display 9 so that the total feed length L+is digitally indicated on the digital display 9 (step S6). Simultaneously, the data $D_{k+1}$ and $N_{k+1}$ are stored in the RAM 29 so that the relationship between the wound fishline diameter D and the number of spool rotations N is obtained as a data map (step S7). If the spool 3 continues to rotate beyond the boundaries of the data map stored in 10 the RAM 29, unwinding the fishline 5 off the spool 3, the program returns to the step S3 to obtain the fishline length of the next calculation cycle (steps S8,S9).

Figure 7B:
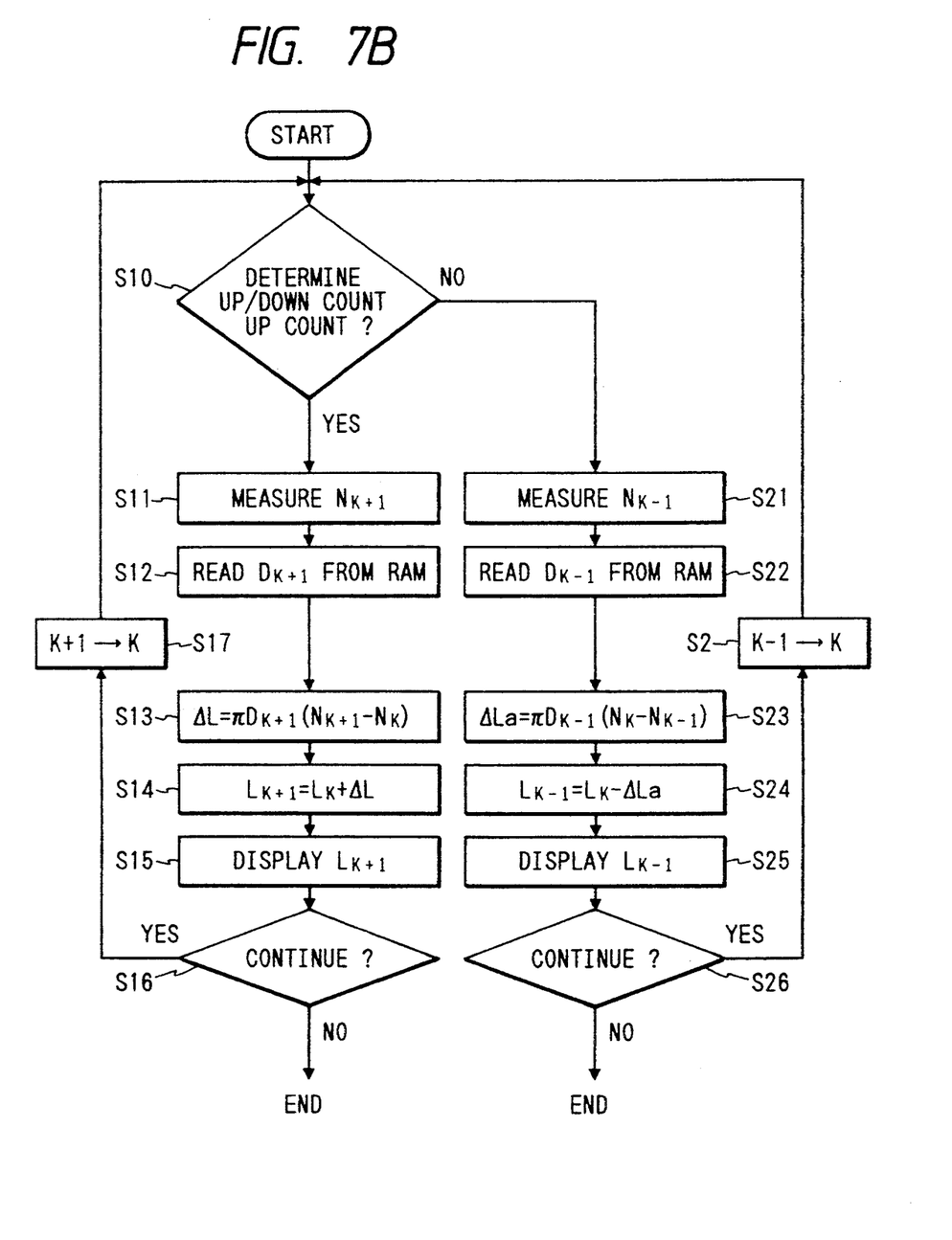
FIG. 7B is a flow-chart showing a process performed in subsequent stages of operating the fishing reel.

After the RAM 29 stores therein the relationship between the fishline diameter D and the number of spool rotations N as a data map, the program shown in FIG. 7B is executed during subsequent fishing to obtain the total fed fishline length L.

For example, when the fishline 5, after being wound onto the spool 3 with the last fish hooked, is again fed off the spool 3 (step S10), the present invention calculates the length of fishline fed out $L_{k+1}$ by detecting only the spool rotation number $N_{k+1}$ (step S11). That is, if the spool rotation number $N_{k+1}$ is determined, then the CPU 25 reads the corresponding fishline diameter $D_{k+1}$ from the data map which is stored in the RAM 29 (step 12), and calculates the total fishline length L+using the formulae $$\Delta L = \pi \times D_{k+1} \times (N_{k+1} - N)$$

and $$L_{k+1} = L_k + \Delta L$$

stored in the ROM 27 (steps 13 and 14).. The calculation result, i.e. the total fishline length unwound off the spool 3 $L_{k+1}$ is digitally indicated on the digital display 9 (step 15). That is to say, once the data map of the diameter $D_{k+1}$ corresponding to the counted number of rotations $N_{k+1}$ is appropriately stored or written in the RAM 29 during the initial fishline feed process, it is unnecessary in the present invention to use the ultrasonic transmitter 19 and the ultrasonic receiver 21 in the subsequent fishline feed processes to obtain the fishline diameter D (steps S16,S17).

When the fishline 5 is wound on the spool 3, a signal indicative of the backward rotation of the spool. 3 is transmitted from the sensor 37 through the interface 31 to the CPU 25 to set the rotation/counter-rotation counter 39 in the down-count state (step S10). Simultaneously, the pulse signals, generated from the sensor 37 every calculation cycle or one rotation of the spool 3, are transmitted through the input interface 31 to the rotation/counter-rotation counter 39 so that the up/-down counter 39 counts the down pulse signals. That is to say, the number of backward spool rotations counted is subtracted from the result which had been obtained in the fishline feed process, so that the number of backward spool rotations N is obtained (step S21), where $N_{k-}$ denotes the number of spool rotations from the start of the program shown in FIG. 7B to a point in time at which the spool 3 is backwardly rotated by one turn or during one calculation cycle after being forwardly rotated by k-turns or during k-cycles. Then, the CPU 25 reads the fishline diameter $D_{k-1}$ corresponding to the measured rotation number $N_{k-1}$ from the map data stored in the RAM 29 (step S22), and calculates the total fishline length wound on the spool $L_{k-1}$ using the formulae $$\Delta La = \pi \times D_{k-1} \times (N_k - N_{k-1})$$

and $$L_{k-1} = L_k - \Delta La$$

(steps S23,S24) stored in the ROM 27. The total fed fishline length $L_{k-1}$ is digitally displayed on the digital display 9 (step S25).

During the feed of the fishline 5, if the number of spool rotations N are beyond the ones contained in the data map, the CPU 25 instructs the ultrasonic sensor 19 to generate again the ultrasonic wave beam 47 so that the relationship between the fishline diameter D and the spool rotation number N is additionally written or stored in the RAM 29.

If the data map should need to be updated because of a change in the material or diameter of the fishline, or because of accumulated error due to elongation of the fishline over a long time period of use, pushing the reset switch 13 causes the device to be put into a data map updating state in which the above-noted initial process for creating a new data map is repeated.

Additionally, the voltage of the signal which appears at the detection terminal 75 during unwinding or winding of the fishline 5 off or on the spool 3 has a linear relationship with respect to the distance d from the surface of the transmitter 19 to the circumferential surface P of the fishline 5, as disclosed in the U.S. application Ser. No. 07/847,905. Thus, it is possible that the voltage of the signal can be used for determining the distance d instead of using the time lag $\Delta T$. In this case, the voltage appearing at the detection terminal 75 every calculation cycle is inputted to the CPU 25 through an A/D convertor. The timer 65 can also be dispensed with.

In the fishline length measurement device according to the embodiment of the present invention, when the delta map data is to be created, pushing the reset switch 13 and thereafter feeding the fishline 5 causes the automatic creation of the map data into the RAM 29. That is, if the reset switch 13 is pushed in advance of initially casting the fishline, the resulting count N of the rotation/counter-rotation counter 13 during the fishline feed is inputted into the CPU 25, as is data outputted from the wound fishline diameter measurement device 11, so that the calculation for obtaining the fishline length L is executed using the formulae stored in the ROM 27. The fishline length L is displayed on the display 9, and simultaneously the relationship between the wound fishline diameter D and the spool rotation number N is augments the data map in the RAM 29.

When the fishline is be fed off again for the next cast after being wound on the spool 3, the wound fishline diameter D corresponding to the detected spool rotation number N is selected from the data map, based on which the next length of fishline length fed off L is calculated and shown on the digital display 9.

Similarly, during the fishline winding process, the signal indicative of the backward rotation is transmitted from the sensor 37 through the input interface 31 to the CPU 25 to set the up/down counter 39 into the down-count state. The pulse signals generated from the sensor 37 in conjunction with the backward rotation 37 are transmitted to the up/down counter 39 whose down count subtracts the number of the pulse signals from the result which has already 10 obtain in the preceding fishline feed process.

The CPU 25 receives the counted result N of the up/down counter 39 every calculation cycle of the microcomputer 23 or every one spool rotation, and executes the calculations using the formulae stored in the ROM 27 based on the counted result and the data map, to determine the total fishline length displayed on the digital display 9.

According to the embodiment, once the relationship between the wound fishline diameter D and the spool rotation number N is written and stored as the data map in the RAM 29 during the initial fishline feed process, the fed fishline length L during subsequent fishline winding and feeding process is calculated based on the map data. Thus, the ultrasonic wave beam 47 is generated only when map data needs to be stored, contrary to the conventional arrangement wherein the ultrasonic transmitter must always generate the ultrasonic wave beam to measure the wound fishline diameter. Thus, according to the present invention, the amount of time the ultrasonic wave beam 47 is operated can be significantly reduced in comparison with the conventional arrangement.

Accordingly, the present arrangement reduces the battery power consumption in comparison with the conventional fishline length measurement devices, thereby reducing the possibility fresh batteries will be required out at a fishing site. Because of the present invention, it is also unnecessary to provide large capacity batteries with their increased weight and size.

In the first embodiment mentioned above, the relationship 10 between the wound fishline circumferential surface diameter D and the spool rotation number N is stored in the ]RAM 29 during the initial casts of the fishline 5. It is also appropriate to for the data map to be stored in the RAM 29 during original winding of the fishline 5 to be used on the spool 3.

In a second embodiment, instead of depressing the reset switch 13, the fisherman depresses the start switch 1! 5 provided on the upper panel 7a at a desired time point during when the fishline 5 is wound from a bobbin onto the spool 3. The depression of the start switch 15 places the device into a data map input condition wherein the ultrasonic transmitter 19 emits the ultrasonic wave beam 47 toward the outer circumferential surface P of the fishline every 0.2 second or every one rotation of the spool 3.

Upon reception of the reflected wave 49 by the ultrasonic receiver 21, the CPU 25 calculates the wound fishline diameter $D_{k+1}$ using the formulae $$d_{k+1} = (v/2) \times \Delta t$$

and $$D_{k+1} = (c - d_{k+1}) \times 2,$$

executes the calculations $$\Delta L = \pi \times D_{k+1} \times (N_{k+1} - N_k)$$

and $$L_{k+1} = L_k + \Delta L$$

based on the calculated fishline diameter $D_{k+1}$ and the number of spool rotations $N_{k+1}$ detected by the up-down counter 39, and then shows the result on the display 9. Simultaneously, the fishline diameters $D_{k+1}$ and the spool rotation number $N_{k+1}$ which are obtained every 0.2 second or every one spool rotation from the input start time point to the termination of the fishline winding of the desired amount, are stored in the RAM 29 as a data map indicative of the relationship between the number of spool rotations and the fishline diameter. If the stop switch is depressed when the winding of the fishline is terminated, then the map data input is terminated and "0" is displayed on the display 9 so that the device is shifted into a fishline length measurement mode.

For updating the data map, an updating state is set by depressing the start switch 15 so that a new data map is written or stored in the RAM 29 by repeating the above-noted processes.

Further, similar to the former embodiment, CPU 25 sends an instruction signal to generate the ultrasonic wave beam 47 from the ultrasonic transmitter 19 when the spool rotation number N goes out of the range of the map data, so that the relationship between the wound fishline diameter D and the spool rotation number N already stored map data in the RAM 29 is augmented.

As in the former .embodiments, this embodiment also has the advantage of significantly reducing the consumption of battery power.

In each of the first and second embodiments, a data map of the fishline diameter D and the number of spool rotations N detected over the entire fishline feeding or winding process provides the relationship therebetween which is stored in the RAM 29.

Alternatively, before the fishline is to be initially fed off the spool 3, the reset switch 13 is depressed. Then, the device is put into an inputtable condition so that the ultrasonic wave beam is emitted from the ultrasonic transmitter 19 toward the outer circumferential surface P of the wound fishline only once.

Upon reception of the reflected wave 49 by the ultrasonic receiver 21, CPU 25 calculates the fishline diameter $D_O$ corresponding to the number of spool rotations $N_O$ (i.e. N=0) using the formulae $$d = (v/2) \times \Delta t$$

and $$D = (c - d) \times 2.$$

Simultaneously, the display 9 indicates the fishline length L (=0 at this starting point), as in the first embodiment.

Figure 8:
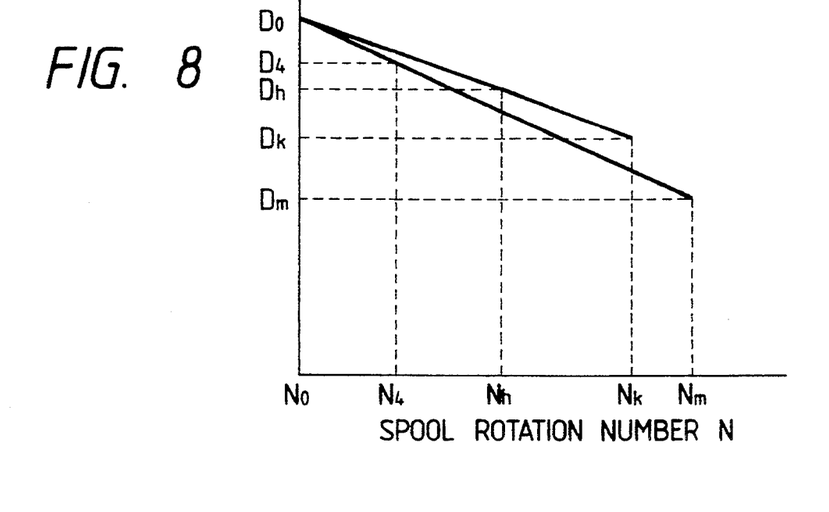
FIG. 8 is a graph showing a relationship between the number of spool rotations and the diameter of the fishline wound on the spool.
Figure 9:
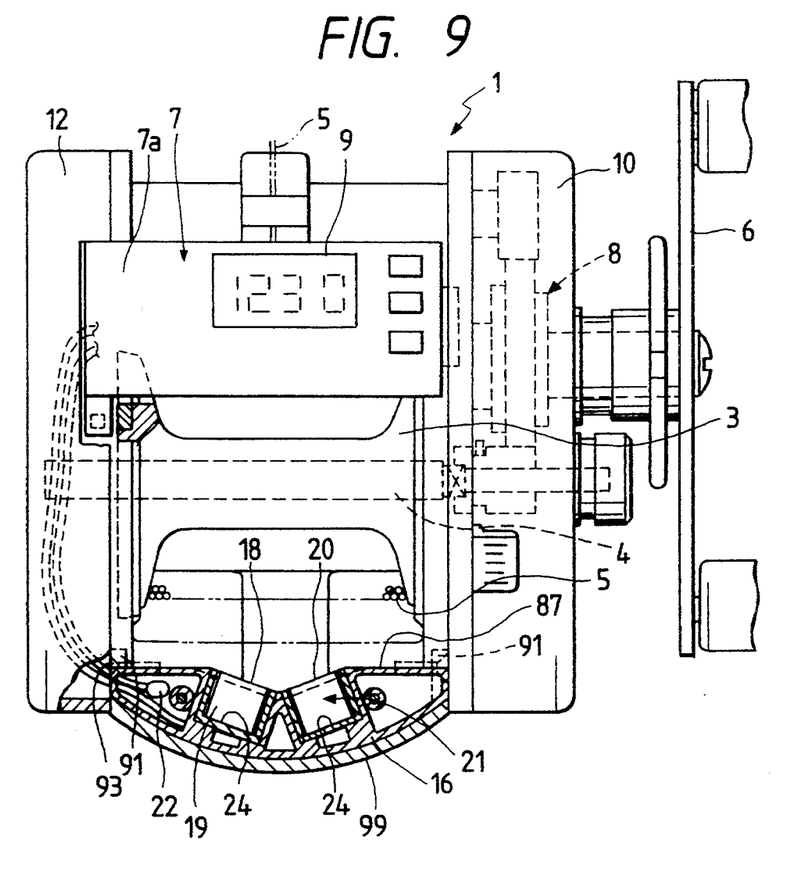
FIG. 9 is a partially cut-away view showing a fishing reel with a fishline length measurement device according to an embodiment of the present invention.

As shown in FIG. 8, at the point in time at which the feed of the fishline 5 is terminated after the spool is rotated $N_k$ times, the ultrasonic transmitter 19 generates the ultrasonic wave beam 47 to the wound fishline outer circumferential surface P once again. Upon reception of the reflected wave 49 by the ultrasonic receiver 21, the CPU 25 calculates the fishline diameter $D_k$ corresponding to the detected number of spool rotations $N_k$ using formulae $$d_k = (v/2) \times \Delta t_k$$

and $$D_k = (c - d_k) \times 2.$$

Based on the obtained values, $D_O$, $N_O$, $D_k$ and $N_k$, the CPU 29 calculates coefficients a and b of $$D = a \times N + b,$$

and the calculated coefficients are written or stored in the RAM 29. When the relationship between the fishline diameter D and the number of spool rotations N is obtained as noted above, the fishline length fed off Lk can be calculated in the CPU 25 with the following formula:

$$L_k = \sum_{x=0}^{k} \pi D_x$$

$$= \sum_{x=0}^{k} \pi(aN_x + b)$$

$$= \tfrac{1}{2}\pi a N_k^2 + \pi b N_k$$

Then, the result is indicated on the display 9.

When the coefficients and for the relationship are determined as noted above, the fishline diameter $D_n$ corresponding to the number of spool rotations $N_h$ ($N_O < N_h < N_k$) can be calculated using the formula $$D_h = a \times N_h + b,$$

so that the total fishline length fed off $L_h$ corresponding to $N_h$ can also be calculated using the formula $$L_h = L_{h-1} + \pi \times D_h.$$

The calculated result, i.e. the fed fishline length $L_h$ is digitally indicated on the display 9. The fed fishline length may be obtained with the formula $$L_h = \tfrac{1}{2}\pi a N_h^2 + \pi b N_n.$$

When a number of spool rotations $N_m$, ($N_m > N_k$) is detected during fishing as shown in FIG. 8, the transmitter 19 emits the beam 47 to obtain the fishline diameter $D_m$ so that the coefficients a and b of the formula $D = a \times N + b$ are updated based on the fishline diameters $D_O$ and $D_m$ and corresponding detected spool rotation numbers $N_O$ and $N_m$. The updated coefficients and are stored in the RAM 29. It is also applicable to arrange the device such that the fishline diameter $D_m$ corresponding to the number of spool rotations $N_m$ is estimated based on the initial relationship of $D = a \times N + b$ without detecting the diameter $D_m$ by emitting the ultrasonic wave beam 47.

Based on these coefficients, the fishline length fed off $L_m$, corresponding to the number of spool rotations $N_m$ is calculated and indicated on the digital display 9.

Since it is sufficient for this embodiment to generate the ultrasonic wave beam 47 from the ultrasonic transmitter 19 at two points, i.e. the number of spool rotations $N_O$ and $N_k$ or the number of spool rotations $N_0$ and $N_m$, it is unnecessary to always generate the ultrasonic wave beam 47 from the ultrasonic transmitter 19.

Therefore, as similar to the first and second embodiments, the desired objects can be achieved in this embodiment. In comparison with the first and second embodiments, this embodiment further reduces the number of times the ultrasonic wave beam 47 is generated, thereby further extending the life of the installed battery.

Note that the third embodiment can be modified so that the coefficients and are determined when the fishline is wound onto the spool 3, as in the second embodiment. In this case, the start switch 15 is depressed before the fishline to be used is wound onto the spool 3. After the fishline has been completely wound onto the spool, the stop switch 17 is depressed. The coefficients a and b of the formula $D = a \times N + b$ are determined from the wound fishline diameters and spool rotation numbers respectively corresponding to start point and stop point. Using the formulae, the fishline length L is calculated and digitally displayed.

In the above-noted embodiments, two ultrasonic wave sensors, i.e. the ultrasonic transmitter 19 and the ultrasonic receiver 21 are used. However, the present invention should not be restricted thereto or thereby. For example, a single common ultrasonic wave transceiver may be used to transmit and receive the ultrasonic wave beam as disclosed in U.S. Application '905. Further, light emission means as disclosed in Japanese Kokai '612 may be used in place of ultrasonic wave generation means. Furthermore, a relationship between the spool rotation number $N_k$ and the total fishline length fed off $L_k$ may be stored in the RAM as a data map or relational formula.

FIGS. 9–17 show details of the fishing reel according to the present invention. Common reference numerals indicate the same elements as discussed above with respect to FIGS. 1–8. In the figures, a manually operated handle 6 transmits rotational torque through a speed reduction gear mechanism 8, which is incorporated inside a right side plate 10 of the main reel body 1. The waterproof box 7 mounted between the right side plate 10 and a left side plate 12 which face each other from a predetermined distance.

A support column 14 is located behind the spool 3 and bridges between the side plates 10,12 so as to function as a thumb rest. To improve the sense of touch to the thumb, the support column 14 is formed with a smooth curved configuration on its upper surface, as is best shown in FIG. 4. The support column 14 projects rearwardly with respect to the main reel body 1.

A sensor support member 16 is attached to the lower surface of the support column 14. Two ultrasonic wave sensors 19,21 are provided in sensor mounting holes 24 of the support member 16, and confront the spool 3.

Sensor support member 16 comprises an upper divided support member 81, a lower divided support member 83, and V-shaped recessed surface 85 at a central portion of a surface 87 confronting the spool 3. The upper and lower divided support members are held together with screws 89 to mutually form the two sensor mounting holes 24 in the surface 87. The ultrasonic sensors 19,21 mounted in the sensor mounting holes 24 respectively emit and receive ultrasonic wave beams.

Mounting pieces 91 are provided on both ends of the upper divided support member 81. Screws 43 fix the sensor support member 16 to the side plates 10,12 of the main reel body 1. The mounting pieces 91 have a predetermined inclined relationship with respect to the sensor support member 16 whereby the support member 16 is obliquely directed upwardly when the sensor support member 16 is attached to the lower surface of the support column 14. This ensures the ultrasonic wave sensors 19,21 are directed at the axis of rotation for the spool shaft 3.

Further, the sensor support member 16, when attached to the support column 14, is located such that its spool confronting surface 87 is located rearwardly of the tip 14a of the support column 14. Owing to this arrangement, water dispersed rearwardly from the spool 3 when the fishline 5 is wound onto the spool 3 is prevented by the support column 14 from spraying the surface 85 provided with the ultrasonic sensors 19,21.

Since the ultrasonic sensors 19,21 are proximate to one another, the outer surfaces of each ultrasonic sensor 19,21 is wrapped by a member 95 made of foamed polyurethane for preventing resonance, and a flexible base plate 97 made of sealing material prevents external and internal noise from affecting the performance of the ultrasonic sensors 19,21. When the ultrasonic sensors 19,21 are mounted in the sensor mounting holes 2224, sensor surfaces 18,20 are flush with the surface 85 of the sensor support member 16. Since water is prevented from spraying the surface 85 as noted above, the water is surely prevented from spraying the sensor surfaces 18,20.

Figure 10:
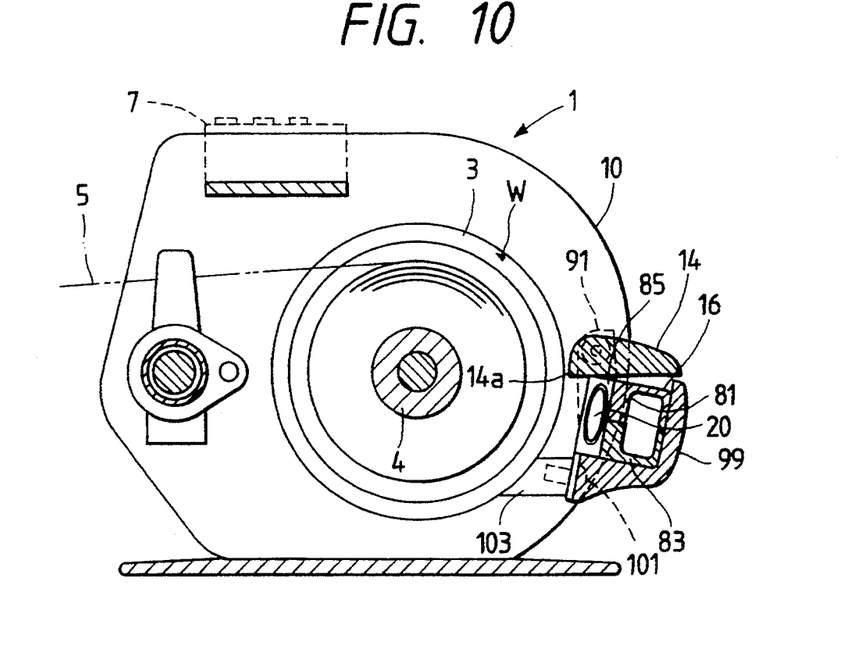
FIG. 10 is a cross-section showing the fishing reel in FIG. 9.
Figure 11:
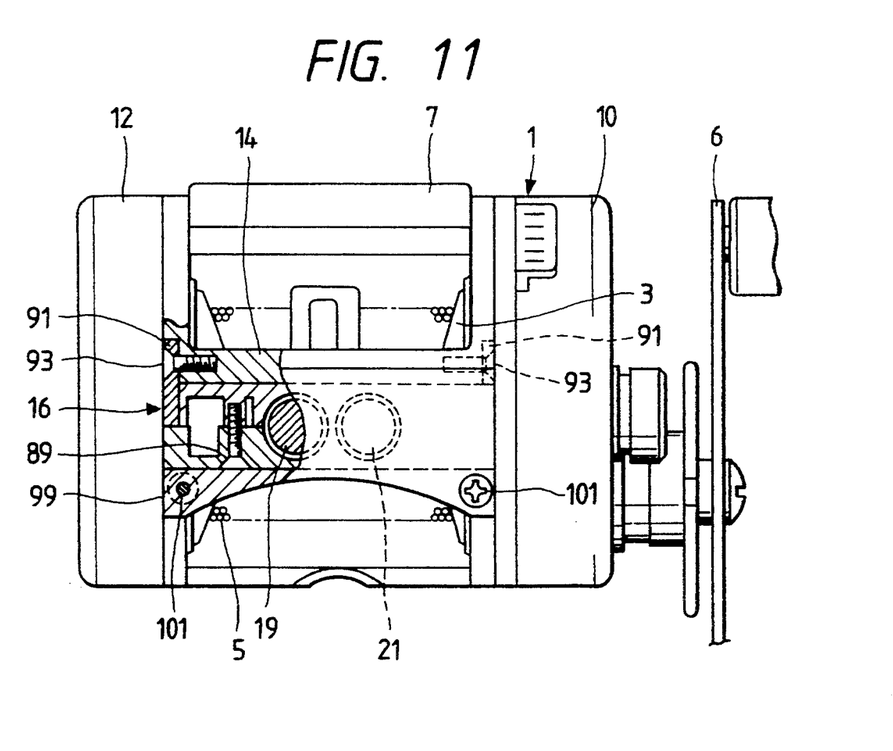
FIG. 11 is a rear view showing the fishing reel in FIG. 9.
Figure 12:
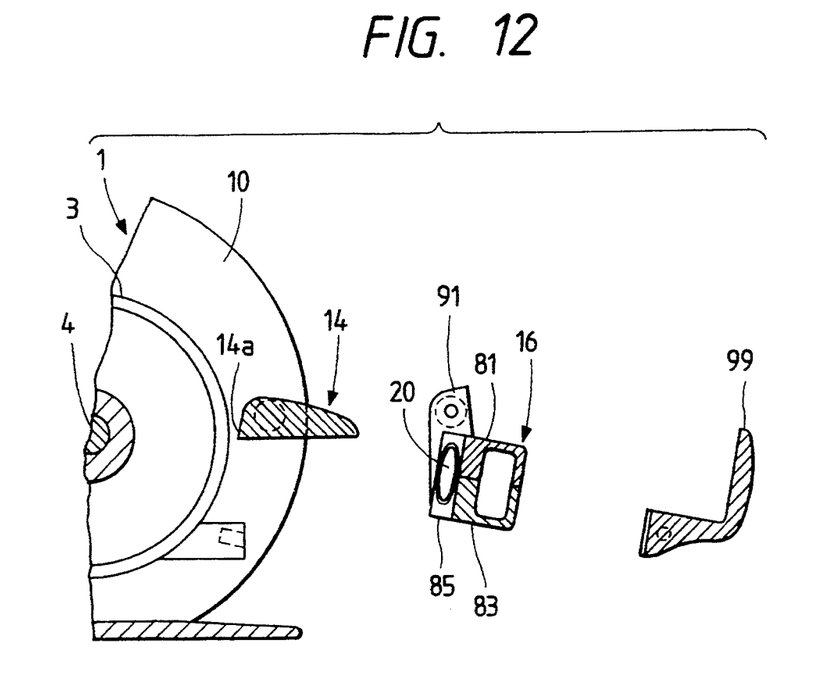
FIG. 12 is an exploded cross-section showing a detail of the fishing reel in FIG. 9.
Figure 13:
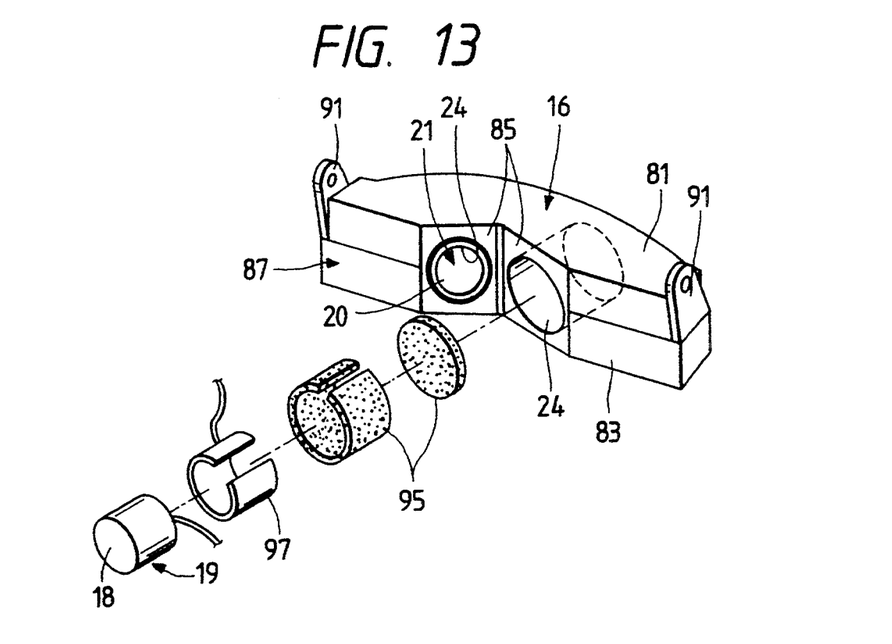
FIG. 13 is an exploded perspective view showing a detail of the fishing reel in FIG. 9.
Figure 14:
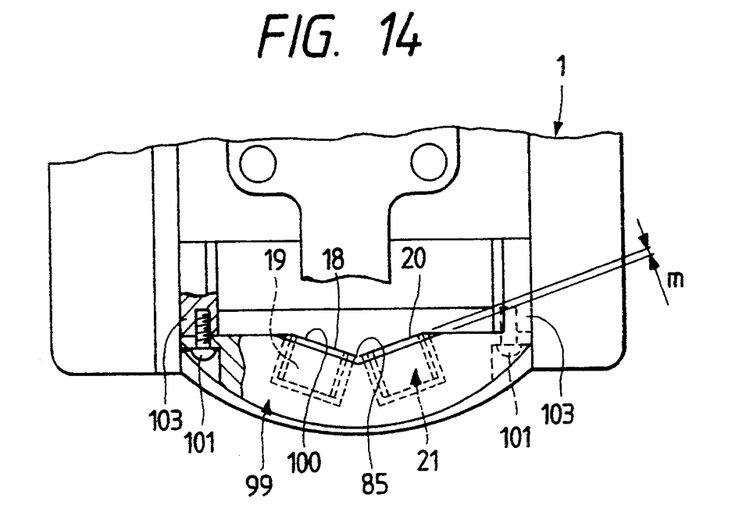
FIG. 14 is a partial cut-away view showing a detail of the fishing reel in FIG. 9.
Figure 15:
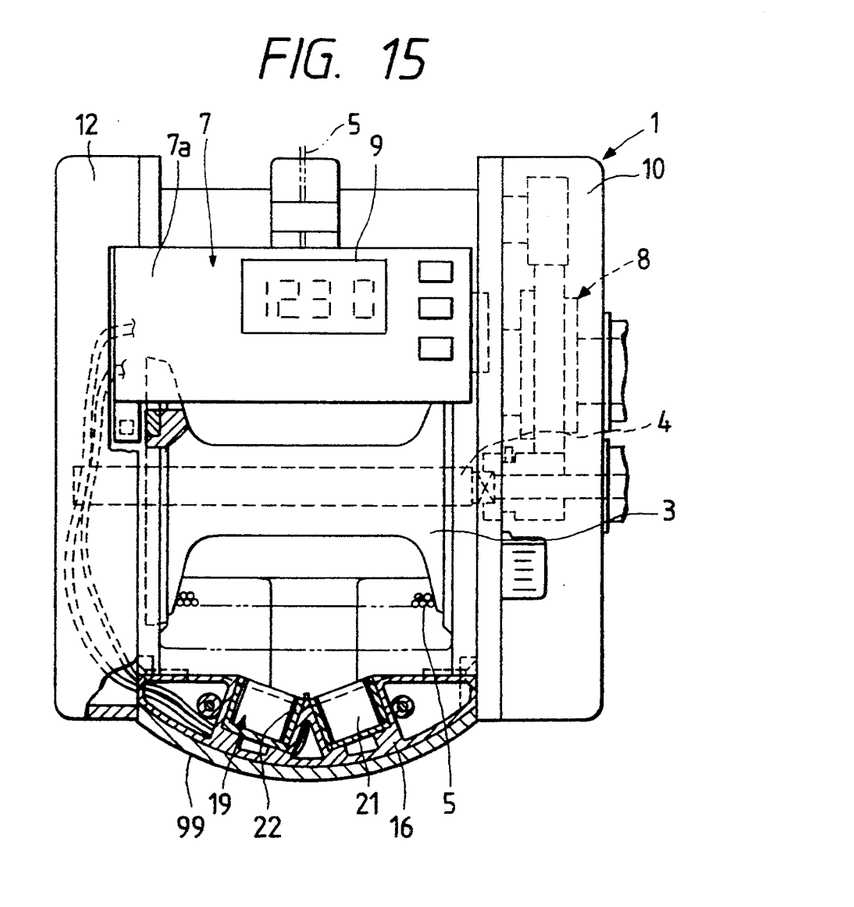
FIG. 15 is a partial cut-away view, similar to FIG. 14, showing a detail of the fishing reel in FIG. 9.
Figure 16:
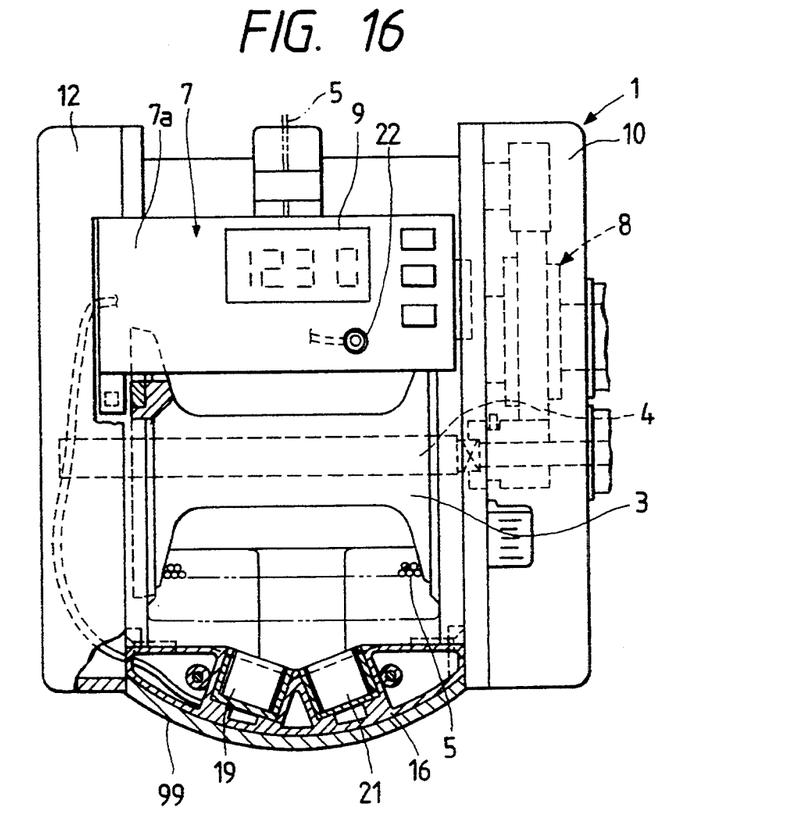
FIG. 16 is a partial cut-away view, similar to FIG. 14, showing a detail of the fishing reel in FIG. 9.
Figure 17:
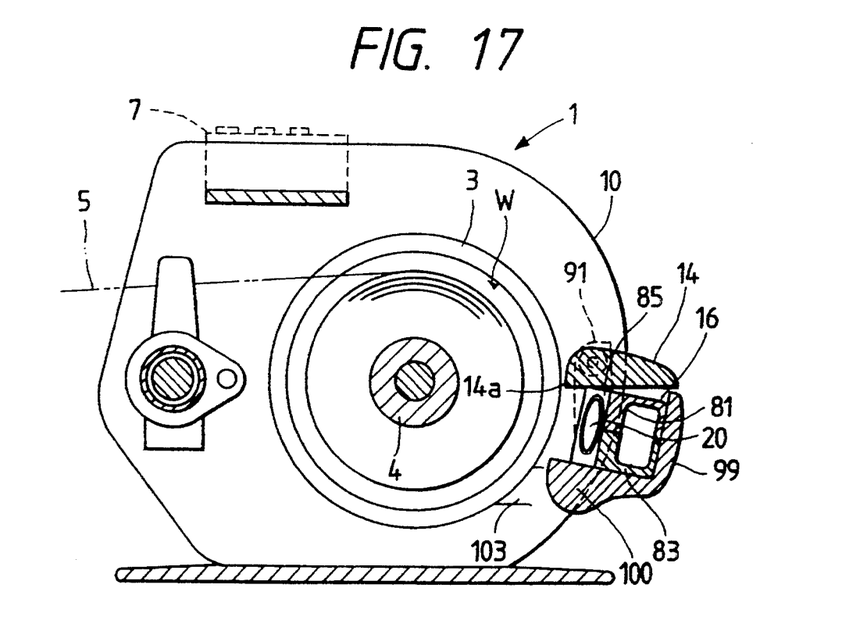
FIG. 17 is a partial cut-away view showing a detail of the fishing reel in FIG. 9.

A protective cover 99 is mounted on the main reel body 1 with screws 101 so as to cover and circumscribe the outer surface of the sensor support member 16. The protective cover 99 protects the sensor support member 16 from external forces applied thereto such as when the reel main body 1 falls. As shown in FIG. 10, the protective cover 99 has a generally L-shaped cross-section to conform with the outer ,configuration of the sensor support member 16. The screws 101 are threadingly engaged with mounting portions 103 of the side plates .10,12.

A tip end 100 of the protective cover 99 is formed into a V-shape at a central portion thereof so as to conform with the V-shaped surface 85. However, the surface 85 projects an amount m (about 1–3mm) toward the spool 3 relative to the tip end 100. This arrangement enables a user to easily clean the sensor surfaces 18,20 with a cotton applicator or the like without removing the protective cover 99.

A temperature sensor 22 is also provided in the sensor support member 16 for detecting ambient temperature around the reel main body 1. The detected temperature is inputted into the microprocessor 23 via the input interface 31.

As generally known, sonic velocity is dependant on the ambient temperature. The velocity V (m/sec) transmitted in air with a temperature of T (° C.) is defined by the formula $$V = (331.5 + 0.61T)$$

stored in the ROM 61. Error accumulation occurs if no consideration is given to changes in ambient temperature, therefore the CPU 25 calculates the actual velocity V of t]e ultrasonic wave beam 47 based on the ambient temperature detected by the temperature sensor 22. Thereafter, the CPU 25 calculates the distance d based on the calculated velocity V. Taking into account the aforementioned formulae stored in the ROM 27, it is possible to accurately determine the length of fishline unwound off or wound on the spool 3. This arrangement is particularly effective in motor driven fishing reels since the heat generated by the motor generally adversely affects the accuracy of a fishline length measurement device.

In addition, the temperature sensor 22 may project from the sensor support member 16 (FIG. 15), or be mounted on the upper panel 7a (FIG. 16), rather than being provided within the sensor support member 16.

Although the velocity V of the ultrasonic wave beam 47 is calculated based on the temperature detected by the temperature sensor 22, it is possible that a relationship between temperature T and lag time Δt, or between the temperature T and the distance d, is stored as a data map in the ROM 27, so that the calculated time lag Δt or the calculated distance d is corrected for the ambient temperature.

The above description and appended drawing figures are provided to explain the present invention. However, the metes and bounds of the present invention are established only by the following claims.

What is claimed is:

1. A fishline length measurement device for a fishing reel, comprising:
   transmission means for emitting an ultrasonic wave beam toward an outer circumferential surface of a spool having a fishline wound thereupon;
   reception means for receiving a reflected ultrasonic wave beam from said outer circumferential surface;
   measuring means for measuring a distance between a sensor surface of at least one of said transmission means and said reception means and said outer circumferential surface;
   mounting means for supporting said transmission means and said reception means with respect to said spool, said mounting means including a support column relatively fixed against rotation with respect to said spool; and
   said support column having means for preventing water sprayed from said fishline upon rotation onto said spool from contacting said transmission and reception means, said preventing means projecting from said support column in a vicinity of said transmission and reception means closer to said spool than said transmission and reception means.

* * * * *